(12) United States Patent
Charbonnel et al.

(10) Patent No.: US 11,773,798 B1
(45) Date of Patent: Oct. 3, 2023

(54) CONTROLLING OPERATION OF AN ENGINE BASED ON EMISSIONS MONITORING

(71) Applicant: Caterpillar Inc., Peoria, IL (US)

(72) Inventors: Sylvain J. Charbonnel, Peoria, IL (US); Gavin Williams, Lincolnhire (GB); Derek A. Tanis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/060,826

(22) Filed: Dec. 1, 2022

(51) Int. Cl.
*F02D 41/02* (2006.01)
*F02D 41/14* (2006.01)
*F01N 3/20* (2006.01)
*F01N 3/08* (2006.01)

(52) U.S. Cl.
CPC ....... *F02D 41/025* (2013.01); *F02D 41/1458* (2013.01); *F01N 3/0842* (2013.01); *F01N 3/208* (2013.01); *F01N 2560/026* (2013.01); *F01N 2900/0412* (2013.01); *F02D 2200/0806* (2013.01)

(58) Field of Classification Search
CPC ............... F02D 41/025; F02D 41/1458; F02D 2200/0806; F01N 3/0842; F01N 3/208; F01N 2560/026; F01N 2900/0412
See application file for complete search history.

(56) References Cited

U.S. PATENT DOCUMENTS

| 8,387,448 | B2 | 3/2013 | Li et al. |
| 10,672,202 | B2 | 6/2020 | Pekar et al. |
| 11,603,787 | B2* | 3/2023 | Van Nieuwstadt ............ F02D 41/1455 |
| 2010/0101214 | A1 | 4/2010 | Herman et al. |
| 2011/0072798 | A1 | 3/2011 | Herman |

* cited by examiner

*Primary Examiner* — Brandon D Lee
(74) *Attorney, Agent, or Firm* — Bookoff McAndrews, PLLC

(57) ABSTRACT

A machine includes an engine, a selective catalytic reduction (SCR) element fixedly connected to an output of the engine, and a controller. The controller is communicatively coupled to the engine and a sensor at an output of the SCR element. The controller is configured to calculate an estimated amount of emissions at a location of the SCR element, calculate an estimated amount of emissions from an output of the SCR element, measure, using the sensor, an actual amount of emissions from the output of the SCR element, and perform a comparison of the estimated amount of emissions and the actual amount of emissions. The controller is further configured to adjust, based on the comparison, the estimated amount of emissions at the location of the SCR element, and control operation of the engine based on the adjusted amount of emissions.

20 Claims, 3 Drawing Sheets

CONTROLLING OPERATION OF AN ENGINE BASED ON EMISSIONS MONITORING

TECHNICAL FIELD

The present disclosure relates generally to controlling operation of an engine, and more particularly, to controlling operation of an engine based on emissions monitoring.

Background

A machine that uses an internal combustion engine to generate at least part of the kinetic energy for operating the machine may be subjected to various regulations regarding the type and/or amount of emissions produced by the internal combustion engine. For example, the regulations may set a limit on the amount of gaseous emissions, such as nitrogen oxides ($NO_x$), carbon dioxide ($CO_2$), or ammonia ($NH_3$), and/or the amount of particulate emissions from the internal combustion engine. In order, to ensure that the regulation limitations are being met during operation of the machine, conventional techniques may monitor emissions from the machine.

U.S. Pat. No. 8,387,448, granted on Mar. 5, 2013 ("the '448 patent"), describes a method for monitoring exhaust gas after-treatment devices. The '448 patent describes a method that uses a sensor to monitor an exhaust gas feedstream in a selective catalytic reduction (SCR) system of a machine during air/fuel excursion. The method then determines an operating effectiveness for the SCR system correlated to the signal output from the sensor. However, the '448 patent does not disclose, for example, monitoring emissions output from the SCR system to predict emissions at a point within the SCR system and using these predictions to control an engine of a machine to control emissions output from the engine.

The system of the present disclosure may solve one or more of the problems set forth above and/or other problems in the art. The scope of the current disclosure, however, is defined by the attached claims, and not by the ability to solve any specific problem.

Summary

In one aspect, a machine may include an engine, a selective catalytic reduction (SCR) element fixedly connected to an output of the engine, and a controller. The controller may be communicatively coupled to the engine and a sensor at an output of the SCR element. The controller may be configured to calculate an estimated amount of emissions at a location of the SCR element, calculate an estimated amount of emission from an output of the SCR element, measure, using the sensor, an actual amount of emissions from the output of the SCR element, and perform a comparison of the estimated amount of emissions from the output of the SCR element and the actual amount of emissions from the output of the SCR element. The controller may be further configured to adjust, based on the comparison, the estimated amount of emissions at the location of the SCR element, and control operation of the engine based on the adjusted amount of emissions.

In another aspect, a method may include calculating an estimated amount of emissions at a location of a selective catalytic reduction (SCR) element of a machine, calculating an estimated amount of emissions from an output of the SCR element, measuring, using a sensor at the output of the SCR element, an actual amount of emissions from the output of the SCR element, and performing a comparison of the estimated amount of emissions from the output of the SCR element and the measured actual amount of emissions from the output of the SCR element. The method may also include adjusting, based on the comparison, the estimated amount of emissions at the location of the SCR element and controlling operation of an engine based on the adjusted amount of emissions.

In yet another aspect, a controller for controlling operation of an engine of a machine may be configured to calculate an estimated amount of emissions at a location of a selective catalytic reduction (SCR) element, measure, using a sensor at the output of the SCR element, an actual amount of emissions from the output of the SCR element, and perform a comparison of the estimated amount of emissions and the actual amount of emissions. The controller may also be configured to determine, based on the comparison, an estimated amount of emissions at a point within the SCR element and control the operation of the engine based on the adjusted amount of emissions.

Other features and aspects of this disclosure will be apparent from the following description and the accompanying drawings.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
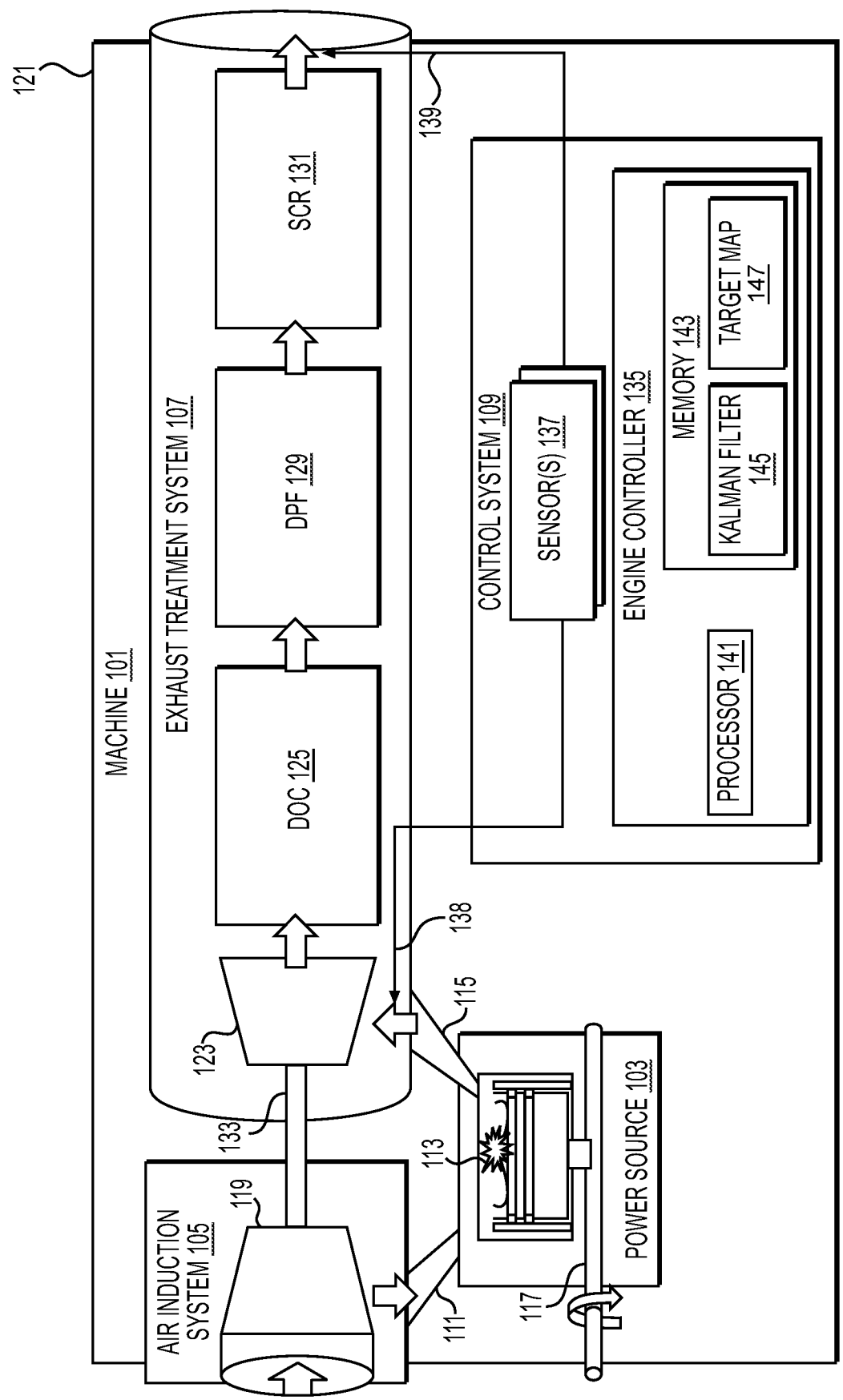
FIG. 1 is a partial schematic view of a machine including a power source controlled by an engine controller, according to aspects of the disclosure.

FIG. 1 is a partial schematic view of a machine including a power source controlled by an engine controller, according to aspects of the disclosure. For example, FIG. 1 illustrates an exemplary machine 101 having multiple systems and components that may operatively cooperate to accomplish a task. Machine 101 may perform various operations associated with an industry such as mining, construction, farming, transportation, power generation, or any other suitable industry. For example, machine 101 may be a mobile machine such as an on-highway vocational vehicle, an off-highway haul truck, an excavator, a dozer, a loader, a motor grader, or any other industrial moving machine. Machine 101 may alternatively be a stationary machine such as a generator set, a furnace, or another suitable stationary machine. Machine 101 may include a power source 103, an air induction system 105, an exhaust treatment system 107, and a control system 109.

In one aspect, power source 103 may include a combustion engine having multiple subsystems that operatively interact to produce mechanical power output. Power source 103 may include, for example, inlet 111 for receiving fuel and/or air, combustion chamber 113 for combusting a mixture of fuel and air, outlet 115 for exhausting a flow of exhaust gas, and power output member 117 for outputting the mechanical power resulting from the combustion. In this aspect, power source 103 is a diesel engine. However, it should be understood that power source 103 may be any other suitable type of combustion engine such as, for example, a gasoline or a gaseous fuel-powered engine, or combinations thereof. Although power source 103 is illustrated as just including a combustion engine, power source 103 may include an electric motor in combination with the combustion engine as part of a hybrid engine system where, e.g., at least a portion of the machine's power may be generated from the combustion engine and at least another portion of the power may be generated from the electric motor. The multiple subsystems included in power source 103 may include, for example, a fuel system, a lubrication system, a cooling system, a drive system, a guidance system, or any other appropriate system.

In one aspect, air induction system 105 may include one or more components that condition and introduce compressed air into combustion chamber 113 of power source 103. For example, air induction system 105 may include compressor 119. In various aspects, air induction system 105 may include different and/or additional components than described above such as, for example, an air filter, an air cooler, inlet bypass components, and other known components.

In one aspect, compressor 119 may be configured to compress the air flowing into inlet 111 of power source 103. Compressor 119 may have a fixed geometry type, a variable geometry type, or any other suitable geometry type. In some aspects, a plurality of compressors may be arranged in series and/or in parallel within air induction system 105.

In one aspect, exhaust treatment system 107 may be configured to treat and direct the flow of the exhaust gases from outlet 115 of power source 103 to atmosphere 121. For example, exhaust treatment system 107 may include turbine 123 and one or more after-treatment components, such as, diesel oxidation catalyst (DOC) 125, diesel particulate filter (DPF) 129, and selective catalytic reduction (SCR) element 131, which may include an ammonia oxidation catalyst (AMOx) in some aspects. It should be understood that these components of exhaust treatment system 107 are exemplary only, and that additional and/or different components may be included in various aspects depending on the configuration of machine 101 and/or power source 103. The location of each catalyst may be changed without limiting the scope of the present disclosure. Turbine 123 may be operatively connected to power source 103 to receive the exhaust gasses flowing from outlet 115 of power source 103, and may be configured to drive compressor 119. For example, as exhaust gases exhausted from power source 103 expand against blades (not shown) of turbine 123, turbine 123 may rotate common shaft 133 to drive compressor 119. In various aspects, a plurality of turbines may be included in parallel or in series within exhaust treatment system 107.

In one aspect, control system 109 may include one or more components that cooperate to monitor the operation of air induction system 105, exhaust treatment system 107, and power source 103. In particular, control system 109 may be configured to sense emissions of machine 101, and, in response to the sensed emissions, perform one or more estimations, calculations, modellings, or the like for control of machine 101 and/or power source 103. Control system 109 may include, for example, engine controller 135 and sensors 137.

In one aspect, engine controller 135 may be operatively connected to sensors 137 and/or other components of machine 101. Engine controller 135 may include one or more processors 141 and one or more memories 143. Various other suitable components, e.g., power supply circuitry, signal conditioning or processing circuitry, or the like, may also be included in engine controller 135 in various aspects. Although depicted as a single element in FIG. 1, it should be understood that engine controller 135, in some aspects, may be distributed over a plurality of elements in any suitable arrangement. Engine controller 135 may maintain a record of the measurements from one or more of the sensors 137.

Machine 101 may include multiple sensors configured to detect emissions of various elements of machine 101. In one aspect, one or more sensors 137 may include a first emissions sensor 138 that measures emissions (e.g., gaseous emissions, such as $NO_x$ or ammonia, or particulate emissions) from power source 103. First emissions sensor 138 may be physically located at an output from power source 103, an input to exhaust treatment system 107, and/or the like to measure emissions from power source 103. Sensors 137 may further include a second emissions sensor 139 that measures emissions from exhaust treatment system 107. Second emissions sensor 139 may be physically located at an output from exhaust treatment system 107 to measure emissions from exhaust treatment system 107. Although not illustrated in FIG. 1, machine 101 may include various other sensors, such as pressure sensors, temperature sensors, speed sensors, and/or the like. In other words, any suitable type of sensor, and any suitable arrangement of one or more sensors 137, may be used in some aspects. Generally, a sensor may be configured to generate a signal indicative of a value associated with an operating condition of machine 101, e.g., that may be received and interpreted by engine controller 135 and/or other components of machine 101.

In one aspect, memory 143 of engine controller 135 may store data and/or software, e.g., instructions, models, algorithms, equations, data tables, or the like, that are usable and/or executable by processor 141 to perform one or more operations for controlling machine 101 and/or an element of machine 101. For example, and as described in more detail elsewhere herein, engine controller 135 may be configured to receive data related to emissions of machine 101, e.g., first sensor 138, second sensor 139, and/or any other suitable source, and generate engine commands based on the data to control the emissions from machine 101. In some aspects, memory 143 may store a model that uses a series of measurements to produce estimates of unknown variables, e.g., Kalman filter 145. As described in more detail elsewhere herein, engine controller 135 may use Kalman filter 145 to compare estimated emissions and measured emissions in order to correct uncertainties in one or more models, algorithms, etc. used for estimating emissions.

Memory 143 may also store target map 147. Target map 147 may include information that correlates emissions from, e.g., SCR element 131 to a performance level of SCR element 131 (e.g., a high performance level that corresponds to a low emissions level or a low performance level that corresponds to a high emissions level). Engine controller 135 may use target map 147 to determine a manner in which to control operation of power source 103 in order to reduce emissions from machine 101 below a certain level, as described elsewhere herein.

Figure 2:
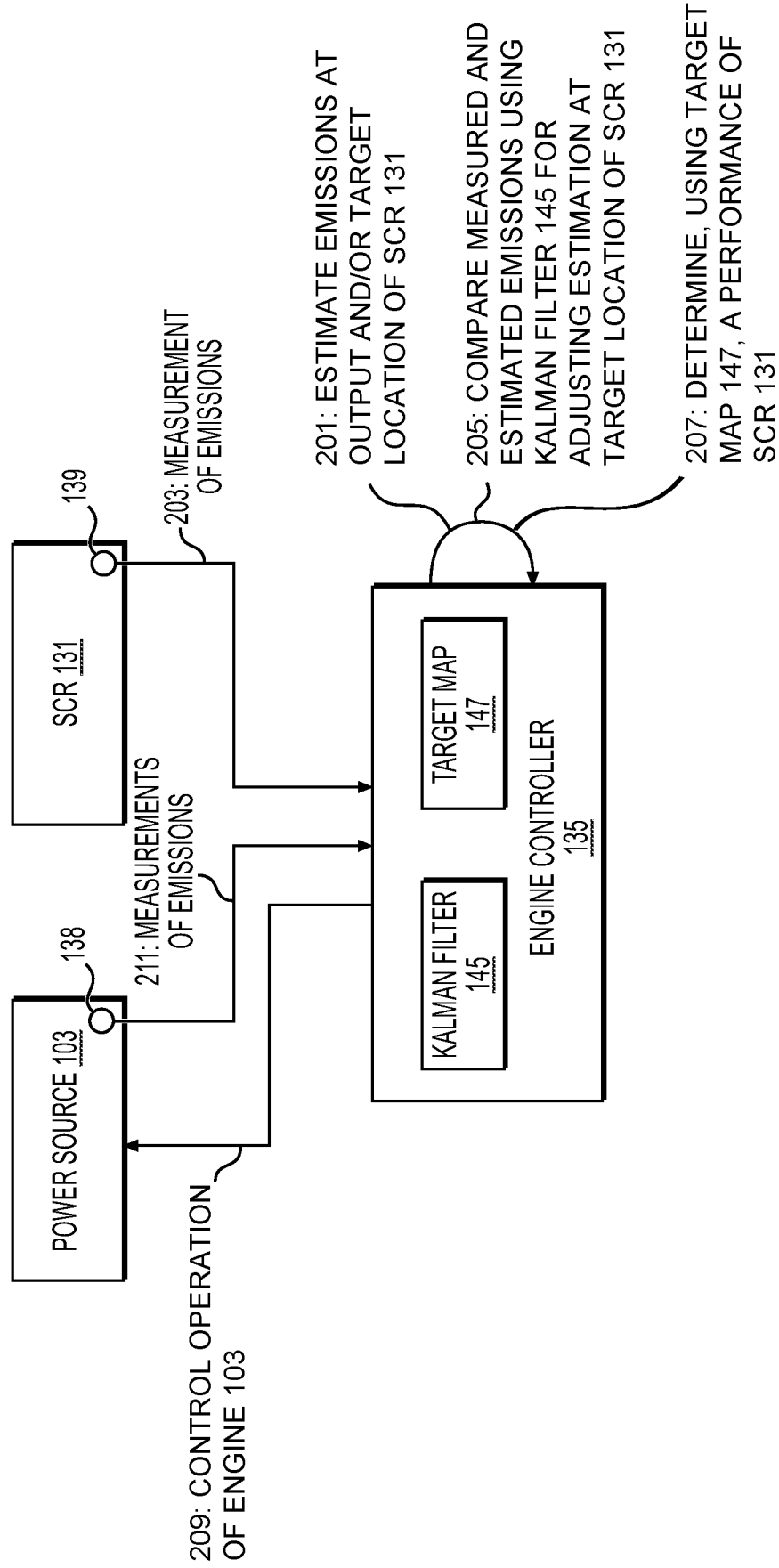
FIG. 2 is a diagram of a system for controlling an engine based on emissions monitoring, according to aspects of the disclosure.

FIG. 2 is a diagram of a system for controlling an engine based on emissions monitoring, according to aspects of the disclosure. For example, the system may include power source (e.g., engine) 103, SCR element 131, engine controller 135, and sensors 138, 139. As illustrated at operation 201, engine controller 135 may calculate or otherwise determine an estimate of emissions at a target location. This target location may be, for example, an upstream portion (e.g., the first 33% of SCR element 131 as measured from an inlet towards the outlet of SCR element 131), a downstream portion (e.g., the final 33% of SCR element 131), or a middle portion (e.g., a section between the upstream 33% and downstream 33% of SCR element 131). In some aspects, operation 201 may involve calculating an estimate of emissions at multiple target locations of SCR element 131 (e.g., two, three, four, or more different target locations such as the midpoint of SCR element 131). Operation 201 may also include calculating an estimate of emissions at an output (e.g., an outlet) of SCR element 131. The estimate calculated for the output of SCR element 131 may be the same as the actual location of sensor 139.

Engine controller 135 may use a model to estimate the emissions at the output of SCR element 131. The model may be configured to emulate SCR element 131 and may estimate the emissions based on a configuration of power source 103. For example, the configuration may include a typical amount of emissions from power source 103, an air-fuel mixture associated with the engine, a point in a piston cycle of the engine for injecting the air-fuel mixture, and/or the like.

As illustrated at operation 203, engine controller 135 may receive, from sensor 139, a measurement of actual emissions at the output of SCR element 131. For example, sensor 139 may send one or more signals to engine controller 135, where the one or more signals are indicative of an actual (e.g., sensed or measured) amount of gaseous and/or particulate emissions at the output of SCR element 131.

As illustrated at operation 205 in FIG. 2, after receiving the measurement of emissions from sensor 139, engine controller 135 may compare the measured emissions and the calculated emissions (e.g., an estimated expected quantity of emissions). This comparison may be performed using, for example, Kalman filter 145, to determine a final (e.g., adjusted) estimation of emissions at other location(s) of SCR element 131, as described below. For example, engine controller 135 may perform a comparison and/or a subsequent adjustment with a Kalman filtering technique (linear, extended, or unscented Kalman filtering).

Based on the deviation between the measured emissions and the calculated emissions, engine controller 135 may be configured to reduce noise (e.g., outlying data points) associated with the measurement, and may estimate one or more unaccounted internal or external disturbances in the model. These adjustments may be propagated to other locations (e.g., mid-SCR) according to the Kalman filter techniques described herein.

In some aspects, the internal or external disturbances may be estimated in operation 205. In particular, the estimated disturbance(s) may correspond to internal disturbances (e.g., uncertainties in the model). While certain aspects may estimate internal disturbances that are not directly measured, a "disturbance" may also include external disturbances that can be measured via one or more sensors or otherwise calculated by engine controller 135. Although certain aspects are described as using Kalman filtering techniques, other filtering methods and/or methods of model correction may be used.

After performing the comparison, engine controller 135 may predict an amount of emissions at one or more of the target points within SCR element 131. For example, engine controller 135 may correct the calculated (e.g., modelled) emissions for SCR element 131 based on an output from Kalman filter 145. This correction may be used to predict (or adjust a prediction of) the amount of emissions at a midpoint or other location(s) within SCR element 131 at which no sensor is present.

As illustrated at operation 207, engine controller 135 may determine, using target map 147, an $NO_x$ target at the target location of SCR element 131. For example, engine controller 135 may perform a lookup of the predicted amount of emissions at the point within SCR element 131 in target map 147 and may determine, based on a match from the lookup, a corresponding performance level of SCR element 131. The performance levels may correspond to relative amounts of predicted emissions, and may exist on a continuous spectrum of different performance levels or a series of discrete performance levels. For example, a first amount of emissions (e.g., less than a first threshold) may correspond to a high performance level, a second amount of emissions higher than the first amount of emissions and less than a second threshold may correspond to a medium performance level, and a third amount of emissions higher than the second amount of emissions and higher than the second threshold may correspond to a low performance level.

Based on the difference between the estimated $NO_x$ at the target location of SCR element 131 and a desired $NO_x$ level, engine controller 135 may adjust its calibration to operate power source 103 at a higher $NO_x$ output (e.g., when an estimated $NO_x$ is less than a target $NO_x$ retrieved with map 147) or lower $NO_x$ output (e.g., when an estimated $NO_x$ is greater than a target $NO_x$ retrieved with map 147).

As illustrated at operation 209, engine controller 135 may control operation of power source 103. For example, engine controller 135 may send one or more commands to electrical and/or mechanical elements of power source 103 to control operation of power source 103 based on the determined configuration. As illustrated at operation 211, engine controller 135 may receive, from sensor 138, measurements of emissions. For example, the measurements of emissions may be from the output of power source 103. Engine controller 135 may monitor emissions from power source 103 based on the measurements of emissions and may modify the configuration for operation of power source 103 based on the monitored emissions. For example, engine controller 135 may re-configure operation of power source 103 to increase emissions output from power source 103 because it was observed that estimated $NO_x$ was lower than the target $NO_x$. Alternatively, and as another example, engine controller 135 may re-configure operation of power source 103 to decrease emissions output from power source 103 due to an estimated $NO_x$ was higher than a target $NO_x$.

Figure 3:
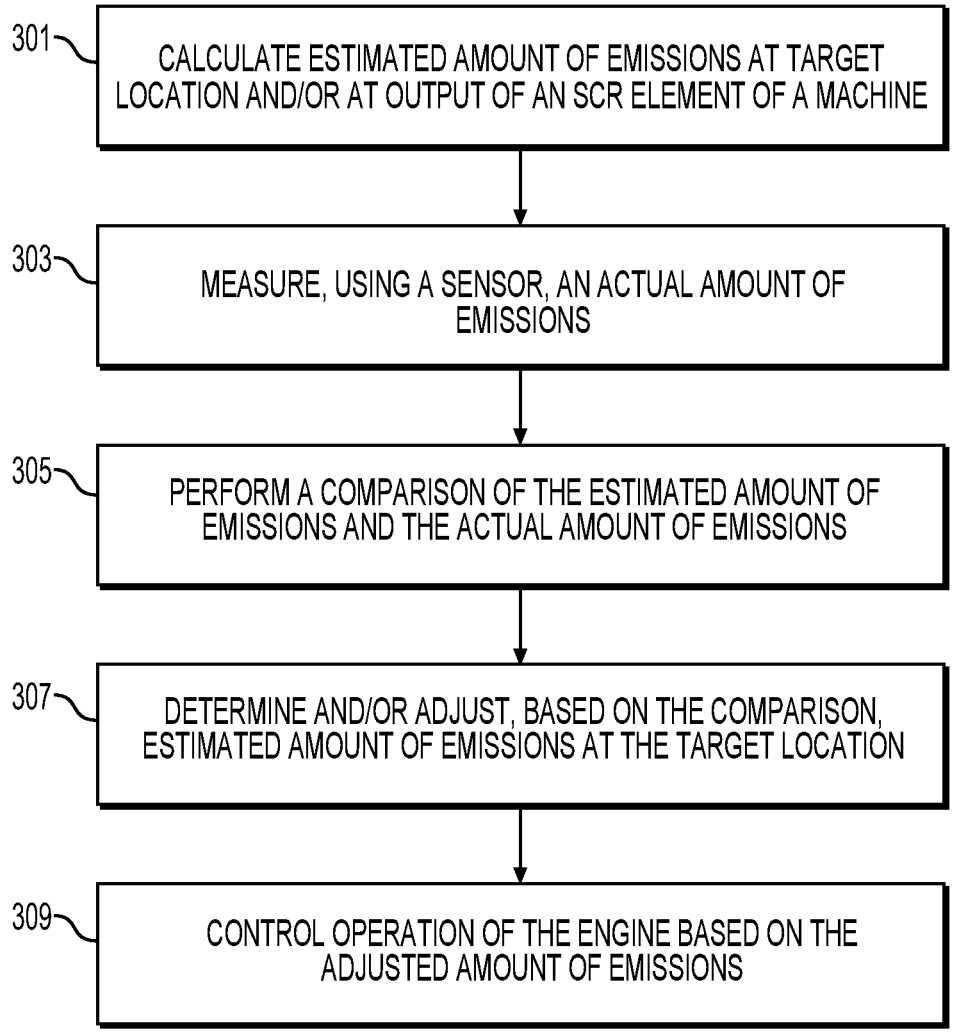
FIG. 3 is a flowchart depicting an exemplary method for controlling operation of an engine based on emissions monitoring, according to aspects of the disclosure.

These and other aspects are described in more detail with respect to FIG. 3.

Industrial Applicability

The disclosed aspects of the system of the present disclosure may be used to help control emissions from power source 103 in a faster and/or more accurate manner. Thus, certain aspects described herein may provide various advantages to operation of machine 101. For example, by estimating emissions at a point within SCR element 131 based on measurements of emissions at an output of SCR element 131, engine controller 135 may be capable of making decisions related to the configuration of power source 103 without needing real-time sensor data at the output of SCR element 131, which may reduce or eliminate latency with regard to making such decisions. For example, relying on real-time sensor data from an output of SCR element 131 may result in engine controller 135 taking too long to make decisions with regard to the configuration of power source 103. In addition, depending on the emissions to be monitored, aspects described herein may provide a way to control operation of power source 103 in a manner not otherwise possible. For example, typical $NO_x$ sensors used for monitoring $NO_x$ emissions may be subject to cross-sensitivity to $NH_3$ for monitoring emissions at a mid-point in an SCR element 131. Thus, by predicting $NO_x$ emissions at the mid-point of SCR element 131, certain aspects may control operation of power source 103 in a manner not otherwise possible using real-time data from sensors.

FIG. 3 is a flowchart depicting an exemplary method 300 for controlling operation of an engine based on emissions monitoring, according to aspects of the disclosure. Although certain aspects are described as controlling emissions from power source 103, certain aspects may be applicable to controlling emissions in connection with other operating parameters of power source 103, such as fuel efficiency of power source 103. The method 300 illustrated in FIG. 3 may be implemented by engine controller 135. The steps of the method 300 described herein may be embodied as machine readable and executable software instructions, software code, or executable computer programs stored in memory 143 and executed by processor 141 of engine controller 135. The software instructions may be further embodied in one or more routines, subroutines, or modules and may utilize various auxiliary libraries and input/output functions to communicate with other equipment. The method 300 illustrated in FIG. 3 may also be associated with an operator interface (e.g., a human-machine interface, such as a graphical user interface (GUI)) through which an operator of machine 101 may configure operations of engine controller 135 (e.g., the manner in which engine controller 135 performs various determinations and/or actions), and/or the like. Therefore, the method 300 may be implemented by engine controller 135 to provide for control of emissions from power source 103. For example, engine controller 135 may predict the emissions at a point within SCR element 131 and may perform one or more actions to control operation of power source 103 to, e.g., reduce emissions below a certain level.

At step 301, the method 300 may include calculating an estimate of an amount of emissions at a target location and/or from an output of an SCR element of a machine. For example, engine controller 135 may estimate an amount of emissions from an upstream portion (e.g., the first 33% of SCR element 131 as measured from an inlet towards the outlet of SCR element 131), a downstream portion (e.g., the final 33% of SCR element 131), or a middle portion (e.g., a section between the upstream 33% and downstream 33% of SCR element 131), or at a plurality of these locations. Step 301 may include estimating emissions from an output of SCR element 131 of machine 101 instead of, or in addition to, the estimation for the target location(s) of SCR element 131. Engine controller 135 may calculate these estimates after an operator of machine 101 starts the engine, based on receiving a command from an operator of machine 101 to perform the estimation, based on using a global positioning system (GPS) to determine that machine 101 is at a certain geographic location where emissions limitations apply, and/or the like.

Engine controller 135 may perform the estimating using a model that emulates SCR element 131. For example, engine controller 135 may input data related to actual or predicted amount of emissions from the engine to the model and may, based on a programmed conversion efficiency or conversion rate of SCR element 131, predict an amount of emissions from SCR element 131.

An amount of emissions may include a volume, a concentration, a presence, and/or the like of one or more gaseous or particulate emissions. For example, an amount of emissions may include a measurement of parts per million by volume (ppmv) for gaseous emissions. As described above, the emissions may include gaseous or particulate emissions generated during combustion of gasoline, diesel, gaseous fuel, and/or the like. For example, gaseous emissions may include $NO_x$, $CO_2$, or $NH_3$, and/or the like and particulate emissions may include partly burned fuel particles, partly burned lube oil, and/or the like.

The method 300 may further include, at step 303, measuring, using a sensor at the output of the SCR element, an actual amount of emissions from the output of the SCR element. For example, engine controller 135 may measure, using sensor 139 at the output of SCR element 131, the amount of emissions from the outlet or other output of SCR element 131. Engine controller 135 may measure the actual amount of emissions after estimating the amount of emissions as described above, in association with estimating these emissions, upon startup of the engine, based on input from a user of machine 101, and/or the like.

Sensor 139, which may be physically located at (or proximate to) the output of SCR element 131, may measure actual emissions in exhaust from SCR element 131 and may send one or more signals to engine controller 135. The one or more signals may be sent periodically, in a streaming (e.g., continuous) manner, and/or the like.

At step 305, the method 300 may include performing a comparison of the estimated amount of emissions at the outlet of SCR 131 and the measured actual amount of emissions at the outlet of SCR 131. For example, engine controller 135 may perform the comparison of the estimated amount of emissions and the measured amount of emissions. Engine controller 135 may perform the comparison after receiving the measured amount of emissions, based on input from an operator of machine 101, and/or the like.

Engine controller 135 may perform the comparison using Kalman filter 145, as described above. For example, Kalman filter 145 may include an extended Kalman filter (EKF), a linear Kalman filter (LKF), an unscented Kalman filter (UKF), and/or the like. Kalman filter 145 may implement a Kalman filtering technique that detects a deviation between the estimated amount of emissions and the measured amount of emissions to identify disturbances in the model used to estimate the first amount of emissions. Continuing with this example, engine controller 135 may input the estimated amount of emissions and the measured amount of emissions to Kalman filter 145 and Kalman filter 145 may output an indication of a deviation between the estimated amount of emissions and the actual amount of emissions.

Engine controller 135 may determine disturbances in the model of SCR element 131 based on the output from Kalman filter 145. For example, engine controller 135 may determine whether the model is accurately estimating emissions output from SCR element 131, is underestimating emissions output from SCR element 131, or is overestimating emissions output from SCR element 131. Based on the determined disturbances, engine controller 135 may adjust the model for SCR element 131 to compensate for the disturbances. For example, engine controller 135 may modify a simulated conversion rate or efficiency of SCR element 131 to reduce or increase emissions estimated from SCR element 131.

The method 300 may include, at step 307, estimating, based on the comparison, an adjusted amount of emissions at a point within the SCR element. For example, engine controller 135 may adjust, based on the comparison, the estimated amount of emissions at a mid-point within SCR element 131 determined during step 301. Alternatively, step 307 may include generating an estimated amount of emissions at the target location based on the comparison without adjusting a previous estimation for the target location. Engine controller 135 may determine the estimated amount of emissions at the target location based on input from a user of machine 101, automatically after performing the comparison, and/or the like.

As described above, the point within SCR element 131 associated with the prediction may include a mid-point within SCR element 131 or any other point within SCR element 131 that does not have a sensor for measuring the emissions. For example, if the emissions to be predicted are $NO_x$ emissions, engine controller 135 may estimate an amount of $NO_x$ emissions at any point within SCR element 131 that lacks a $NO_x$ sensor, even if other sensors for measuring other emissions are present at that point within SCR element 131.

Engine controller 135 may estimate the amount of emissions at the target location(s) using the model for SCR element 131. For example, based on the simulated conversion rate or efficiency for the entire length of SCR element 131, engine controller 135 may predict these emissions at a point along SCR element 131. Continuing with the previous example, for a mid-point within SCR element 131, engine controller 135 may emissions based on half of the conversion rate for SCR element 131.

Engine controller 135 may determine a performance level of SCR element 131 based on the predicted third amount of emissions. For example, engine controller 135 may use target map 147 to determine the performance level. Target map 147 may include information that identifies various amounts of emissions at the point within SCR element 131 and corresponding performance levels for the various amounts of emissions. For example, target map 147 may identify amounts of emissions corresponding to a low performance level (e.g., where SCR element 131 is performing poorly and is associated with a high level of emissions at the point), a medium performance level (e.g., where SCR element 131 is performing better than at the low performance level and is associated with a moderate level of emissions at the point), and a high performance level (e.g., where SCR element 131 is performing better than at the moderate performance level and is associated with a low level of emissions at the point).

At step 309, the method 300 may include controlling operation of an engine of the machine based on the estimated (e.g., adjusted) amount of emissions at the target location(s). For example, engine controller 135 may control operation of the engine of machine 101 based on the adjusted amount of emissions at the target location(s). Engine controller 135 may control the operation after estimating the amount of emissions, based on the determined performance level, based on input from a user of machine 101, and/or the like.

Engine controller 135 may determine a configuration for operation of the engine. For example, the configuration may include an air-fuel mixture associated with the engine, a point in a piston cycle of the engine for injecting the air-fuel mixture, a timing of injecting the air-fuel mixture, a pressure for injecting the air-fuel mixture, or a manner of injecting the air-fuel mixture (e.g., a spray shape of the fuel during injection). Engine controller 135 may determine a configuration that is to reduce emissions, increase emissions, or maintain a current level of emissions. For example, engine controller 135 may determine a configuration that reduces emissions below a threshold, that increases emissions to a threshold, or that maintains the current level of emissions.

Engine controller 135 may send one or more signals to one or more electro-mechanical components of the engine to implement the configuration. For example, engine controller 135 may send one or more signals to modify a fuel spray shape from a fuel injector of the engine, to modify timing of the fuel injection, a pressure of the fuel injection, and/or the like.

During operation of the engine, engine controller 135 may receive measurements of emissions at an output from the engine. For example, engine controller 135 may receive measurements of emissions from sensor 138 located at the output of the engine. Engine controller 135 may modify the configuration for the engine depending on the measured emissions from the engine. For example, engine controller 135 may modify the configuration to increase or reduce emissions to control the emissions from the engine if the emissions from the engine are below an expected amount of emissions or exceed an expected amount of emissions.

Although the method 300 illustrated in FIG. 3 is described as including steps 301 through 309, the method 300 may not include all of these steps or may include additional or different steps. For example, the method 300 may include the additional step of starting the engine. In addition, although the method 300 is described in the context of an engine, the method 300 may apply to any power source 103.

Certain aspects described herein may control emissions from machine 101 by controlling operations of power source 103 by predicting an amount of emissions at a point within SCR element 131. This may reduce latency with respect to detecting emissions levels that exceed allowable limitations and/or may facilitate detection of issues related to emissions from the machine 101 that may not be captured during the process of engine calibration. In addition, certain aspects may facilitate taking corrective action with respect to emissions from machine 101, which may improve operations of machine 101 with respect to emissions from machine 101. Furthermore, certain aspects may predict emissions at a point within SCR element 131 where a physical sensor may not be present, or where a sensor does not provide an accurate measurement due to cross-sensitivity (for example, when a sensor's measurement is impacted by exhaust constituents other than $NO_x$), which may improve control of emissions from machine 101.

It will be apparent to those skilled in the art that various modifications and variations can be made to the disclosed system without departing from the scope of the disclosure. Other aspects of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A machine, comprising:
an engine;
a selective catalytic reduction (SCR) element fixedly connected to an output of the engine; and
a controller communicatively coupled to the engine and a sensor at an output of the SCR element, wherein the controller is configured to:
calculate an estimated amount of emissions at a location of the SCR element;
calculate an estimated amount of emissions from an output of the SCR element;
measure, using the sensor, an actual amount of emissions from the output of the SCR element;
perform a comparison of the estimated amount of emissions from the output of the SCR element and the actual amount of emissions from the output of the SCR element;
adjust, based on the comparison, the estimated amount of emissions at the location of the SCR element; and
control operation of the engine based on the adjusted amount of emissions.

2. The machine of claim 1, wherein the controller is further configured, when performing the comparison, to:
perform the comparison using a linear Kalman filter, an extended Kalman filter, or an unscented Kalman filter.

3. The machine of claim 1, wherein the location of the SCR element is a mid-point within the SCR element.

4. The machine of claim 1, wherein the controller is further configured, when controlling the operation of the engine, to:
control the operation of the engine based on a difference between the adjusted amount of emissions and a target amount of emissions of the SCR element, the target amount of emissions being retrieved from a map.

5. The machine of claim 4, wherein the controller is further configured to calculate estimated amounts of emissions at a plurality of locations of the SCR element and adjust the estimated amounts of emissions based on the comparison.

6. The machine of claim 5, wherein the plurality of locations of the SCR element includes an upstream portion of the SCR element.

7. The machine of claim 1, wherein the controller is further configured, when controlling the operation of the engine, to:
control at least one of:
an air-fuel mixture associated with the engine;
a point in a piston cycle of the engine for injecting the air-fuel mixture;
a timing of injecting the air-fuel mixture;
a pressure for injecting the air-fuel mixture; or
a manner of injecting the air-fuel mixture.

8. A method, comprising:
calculating an estimated amount of emissions at a location of a selective catalytic reduction (SCR) element of a machine;
calculating an estimated amount of emissions from an output of the SCR element;
measuring, using a sensor at the output of the SCR element, an actual amount of emissions from the output of the SCR element;
performing a comparison of the estimated amount of emissions from the output of the SCR element and the measured actual amount of emissions from the output of the SCR element;
adjusting, based on the comparison, the estimated amount of emissions at the location of the SCR element; and
controlling operation of an engine based on the adjusted amount of emissions.

9. The method of claim 8, wherein the performing of the comparison further comprises:
performing the comparison using a linear Kalman filter, an extended Kalman filter, or an unscented Kalman filter.

10. The method of claim 8, wherein the location of the SCR element is a mid-point within the SCR element.

11. The method of claim 8, wherein the controlling of the operation of the engine further comprises:
controlling the operation of the engine based on a difference between the estimated amount of emissions and a target amount of emissions of the SCR element, the target amount of emissions being retrieved from a map.

12. The method of claim 11, wherein estimated amounts of emissions are calculated for a plurality of locations of the SCR element and adjusted based on the comparison.

13. The method of claim 12, wherein the plurality of locations of the SCR element includes an upstream portion of the SCR element.

14. The method of claim 8, wherein the controlling of the operation of the engine further comprises:
controlling at least one of:
an air-fuel mixture associated with the engine;
a point in a piston cycle of the engine for injecting the air-fuel mixture;
a timing of injecting the air-fuel mixture;
a pressure for injecting the air-fuel mixture; or
a manner of injecting the air-fuel mixture.

15. A controller for controlling operation of an engine of a machine, the controller being configured to:
calculate an estimated amount of emissions from an output of a selective catalytic reduction (SCR) element;
measure, using a sensor at the output of the SCR element, an actual amount of emissions from the output of the SCR element;
perform a comparison of the estimated amount of emissions and the actual amount of emissions;
determine, based on the comparison, an estimated amount of emissions at a point within the SCR element; and
control the operation of the engine based on the determined amount of emissions at the point within the SCR element.

16. The controller of claim 15, further configured, when performing the comparison, to:
perform the comparison using a Kalman filter.

17. The controller of claim 15, wherein the point within the SCR element is a mid-point within the SCR element.

18. The controller of claim 15, further configured, when controlling the operation of the engine, to:
control the operation of the engine based on a difference between the estimated amount of emissions at the point within the SCR element and a target amount of emissions, the target amount of emissions being retrieved from a map.

19. The controller of claim 15, further configured to calculate estimated amounts of emissions at a plurality of locations of the SCR element and adjust the estimated amounts of emissions at the plurality of locations based on the comparison.

20. The controller of claim 19, wherein the plurality of locations of the SCR element includes an upstream portion of the SCR.

* * * * *